United States Patent [19]
Bahn

[11] Patent Number: 5,138,244
[45] Date of Patent: Aug. 11, 1992

[54] RELUCTANCE-TYPE ELECTRIC MOTOR

[75] Inventor: Itsuki Bahn, Tokyo, Japan

[73] Assignee: Kabushikigaisha Sekogiken, Tokyo, Japan

[21] Appl. No.: 651,254

[22] PCT Filed: Aug. 2, 1990

[86] PCT No.: PCT/JP90/00988
§ 371 Date: Apr. 2, 1991
§ 102(e) Date: Apr. 2, 1991

[87] PCT Pub. No.: WO91/02402
PCT Pub. Date: Feb. 21, 1991

[30] Foreign Application Priority Data
Aug. 3, 1989 [JP] Japan .................................. 1-200402

[51] Int. Cl.⁵ .............................................. H02P 6/02
[52] U.S. Cl. ...................................... 318/701; 318/254
[58] Field of Search .............. 318/701, 798, 799, 807, 318/809, 139, 254, 811, 439

[56] References Cited
U.S. PATENT DOCUMENTS

| | | | |
|---|---|---|---|
| 4,282,464 | 8/1981 | Uzuka | 318/138 |
| 4,670,696 | 6/1987 | Byrne et al. | 318/701 |
| 4,698,537 | 10/1987 | Byrne et al. | 318/138 |
| 4,739,203 | 4/1988 | Miyao et al. | 318/254 |
| 4,739,240 | 4/1988 | MacMinn et al. | 318/811 |

Primary Examiner—William M. Shoop, Jr.
Assistant Examiner—John W. Cabeca
Attorney, Agent, or Firm—Staas & Halsey

[57] ABSTRACT

A reluctance-type motor which is used as a drive source of industrial equipment, and particularly as a servo motor, wherein an armature current is held at a preset value by chopper control in a section where a position detecting signal is present. Stored magnetic energy of an armature coil is converted to the stored magnetic energy of an armature coil to be energized next, thereby rapidly extinguishing the discharge current and simultaneously making the rise of the energization current of the next armature coil rapid. Accordingly, a motor of a highspeed and torque can be provided. Power is supplied from a D.C. power supply via a forwardly connected diode, and if necessary, a capacitor connected in parallel with the power supply can be additionally used.

2 Claims, 11 Drawing Sheets

RELUCTANCE-TYPE ELECTRIC MOTOR

FIELD OF THE INVENTION

This invention is related to a reluctance-type electric motor which is used for the drive source of industrial equipment as a highly efficient D.C. motor having a large output torque and small torque ripple, and which is particularly effective when used as a servo motor.

BACKGROUND OF THE INVENTION

Traditionally, the number of phases cannot be made as large in a reluctance-type motor as in a typical commutator motor. This is because practicability is lost since the cost of the semiconductor circuit of each phase is high.

Accordingly, the stored magnetic energy of each magnetic pole becomes large and it takes time to discharge and store. Thus there is a problem that the torque becomes high but the speed does not.

Further, particularly in a reluctance-type motor having a large output torque, the number of magnetic poles of the armature becomes large and the air-gap of the magnetic path thereof is small, so that the stored magnetic energy is large, whereby the above-mentioned inconvenience is accelerated.

The higher the torque, the more impossible the solution to this problem.

Next, because of the large inductance of armature coils, there is a problem that the rise and fall times of the armature current increase thereby making the ripple of the output torque large.

Moreover, there is a problem that an efficiency is also degraded.

Accordingly, it is the object of this invention to provide a reluctance-type motor which is high-speed, highly efficient, small-sized and inexpensive.

SUMMARY OF THE INVENTION

This invention compress a two-phase reluctance-type motor in which, when the armature coils of each phase are energized with a fixed current, the torque becomes maximum in the vicinity of an electrical angle of 10 to 20 degrees since the salient poles of the rotor start to enter the magnetic poles and thereafter a flat torque is obtained only for a predetermined section. This reluctance-type motor in which the ripple torque has been removed comprises a position detecting unit including position detecting elements for detecting positions of salient poles by which first, second, third and fourth single-phase position detecting signals are obtained in which there are disposed continuous position detecting signals having an electrical angle having a width of 90 degrees that are not superposed in time, semiconductor switching elements connected to both ends of 1st, $\overline{\text{1st}}$, 2nd and 2nd armature coils when the armature coils of a 1st and 2nd phase are formed into 1st and 1st armature coils and 2nd and 2nd armature coils, respectively, diodes which are reversely connected to the series connecting body of the respective semiconductor switching elements and the armature coils, energization control circuit which makes the semiconductor switching elements conductive by means of the 1st, 2nd, 3rd and 4th position detecting signals to energize the 1st, 2nd, 1st and 2nd armature coils, thereby generating an output torque in one direction, a d.c. power supply for supplying power to the energization control circuit via one diode forwardly inserted in the positive or negative electrode side of the power supply, means for adjusting the fixing positions of the position detecting elements to initiate the energization of each the armature coil from the vicinity where the torque becomes maximum, a chopper circuit for holding the armature current at a preset value, and an electric circuit which, when the armature coil is controlled for energization by a position detecting signal is de-energized at the end of the position detecting signal, prevents the magnetic energy stored in the armature coil from being fed back to the D.C. power supply via the reversely connected diodes by means of the one diode forwardly inserted in the power supply side, and converts the magnetic energy to the stored magnetic energy of the armature coil to be energized next, thereby making the rise and fall of the armature current rapid.

This invention further comprises a three-phase reluctance-type motor in which when the armature coils of each phase are energized with a fixed current, the torque becomes maximum in the vicinity of an electrical angle of 10 to 20 degrees since the salient poles of the rotor start to enter the magnetic poles and thereafter a flat torque is obtained only for a predetermined section. This reluctance-type motor in which the ripple torque has been removed comprises a position detecting unit including position detecting elements for detecting the positions of the salient poles by which the position detecting signals of an A-phase having disposed therein continuous 1st, 2nd and 3rd position detecting signals having a width of 120 degrees an electrical angle of that are not superposed in time are obtained, and by which the position detecting signals of a B-phase having disposed therein 4th, 5th and 6th position detecting signals that have a phase difference of an electrical angle of 60 degrees in electrical angle from the 1st, 2nd and 3rd position detecting signals are obtained, semiconductor switching elements connected to both ends of 1st, $\overline{\text{1st}}$, 2nd, $\overline{\text{2nd}}$, 3rd and $\overline{\text{3rd}}$ armature coils when the armature coils of first, second and third phases are formed into said 1st, $\overline{\text{1st}}$ armature coils, 2nd, $\overline{\text{2nd}}$ armature coils and 3rd, $\overline{\text{3rd}}$ armature coils, respectively, diodes are reversely connected to the series connecting body of the respective semiconductor switching elements and the armature coils, a first energization control circuit makes the semiconductor switching elements conductive by means of the 1st, 2nd and 3rd position detecting signals to energize the 1st, 2nd and 3rd armature coils, respectively, thereby generating an output torque in one direction, a second energization control circuit which makes the semiconductor switching elements conductive by means of the 4th, 5th and 6th position detecting signals to energize the $\overline{\text{1st}}$, $\overline{\text{2nd}}$ and $\overline{\text{3rd}}$ armature coils, respectively, thereby generating a torque in the same direction, a D.C. power supply for supplying power to the first and second energization control circuits via first and second diodes which are forwardly inserted in the positive or negative electrode of the power supply, means for adjusting the fixing positions of the position detecting elements to initiate the energization of each armature coil from the vicinity where the torque becomes maximum, a chopper circuit for holding the armature current at a preset value, and an electric circuit which, when the armature coils being energized by the 1st, 2nd and 3rd position detecting signals are de-energized at the end of the position detecting signals, prevents the magnetic energy stored in the armature coils from being fed back to the D.C. power supply via the reversely connected diodes by means of the first diode, and converts the magnetic energy to the stored magnetic energy of the armature coil to be energized next, and which, when the armature coils are energized by the 4th, 5th and 6th position detecting signals are de-energized at the end of the position detecting signals, prevents the magnetic energy stored in the armature coils from being fed back to the D.C. power supply via the reversely connected diodes by means of the second diode, and converts the magnetic energy to the magnetic energy of the armature coil to be energized next, thereby making the rise and fall of the armature current rapid.

In accordance with this invention, in a certain section of position detecting signals, by holding the armature current at a preset value, and at an end thereof, by converting the stored magnetic energy of the armature coil to the stored magnetic energy of the armature coil to be energized next, the discharge current is rapidly extinguished, and simultaneously the rise of the energization current of the next armature coil is made rapid. Accordingly, a high-speed and high-torque motor can be provided.

For the above described action, power is supplied from the applied D.C. power supply through a forwardly connected diode, and in addition, a capacitor connected in parallel with the power supply is used if necessary.

Well-known means for providing a high speed and high torque achieves the object by increasing the applied voltage, but this device inconveniently degrades the efficiency. In addition, a limit is also imposed on the high speed, and generally a speed higher than 10,000 revolutions per minute is impossible.

In accordance with the invention, the rise of the energization current in the beginning of a position detection signal and the width of the falling current in the end of the position detecting signal can be made small as described above, and thus there is an action that the generation of reduction in torque and counter-torque can be suppressed, whereby a motor having a speed of approximately 100,000 revolutions per minute is obtained.

Since delay of the energization of an armature coil due to large inductance is removed, the energization can be performed with a preset current for the width of a position detecting signal.

Consequently, by adjusting the fixing position of the position detecting elements, the energization can be executed only in the sections in which the torque is flat, and thus there is an action that the torque ripple of the output torque is removed and a highly efficient motor is obtained.

Even if the power supply voltage is low, a fast and highly efficient reluctance-type motor is achieved.

For a single-phase A.C. power supply, the capacity of a capacitor (for smoothing) may be made small as compared with the prior art.

For a three-phase a.c. power supply, the smoothing capacitor further becomes so small that the power supply is simplified.

By making the armature coils of a single phase or dividing them into an A-phase and a B-phase, the energization control circuit is simplified, and becomes small-sized and inexpensive.

BRIEF DESCRIPTION OF THE DRAWINGS

FIG. 1 (b) is a plan view of the structure of a two-phase reluctance-type motor;

DESCRIPTION OF THE PREFERRED EMBODIMENT

This invention is described according to an embodiment with reference to the drawings.

Hereinafter angles are all designated as electrical angles.

Figure 1:
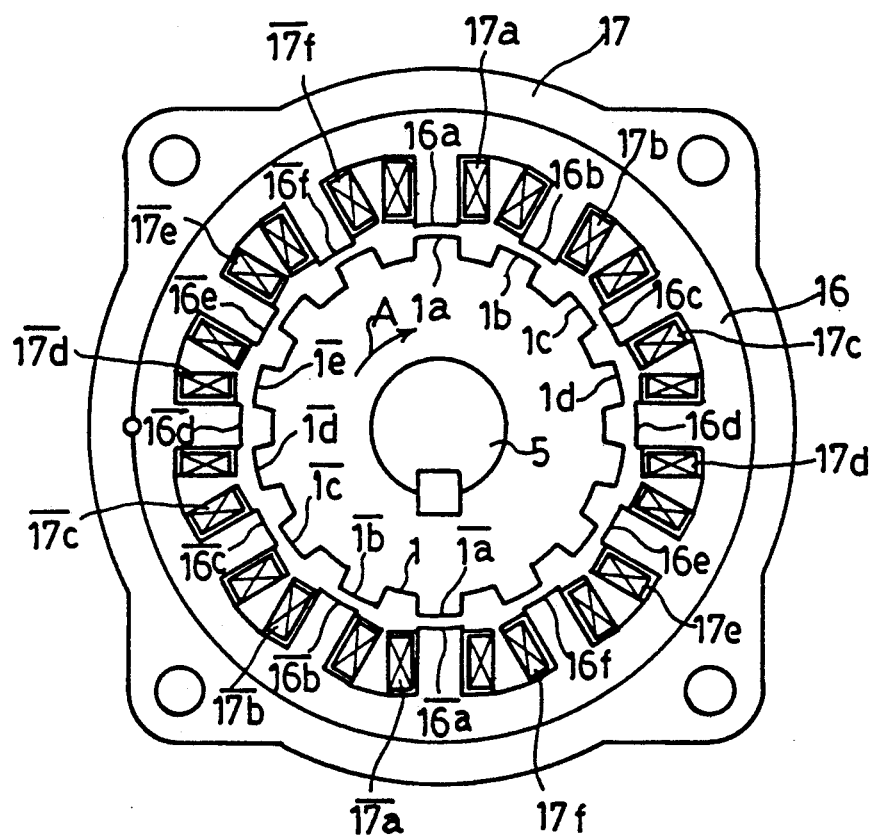
FIG. 1 (a) is a plan view of the structure of a three-phase reluctance-type motor.
Figure 1:
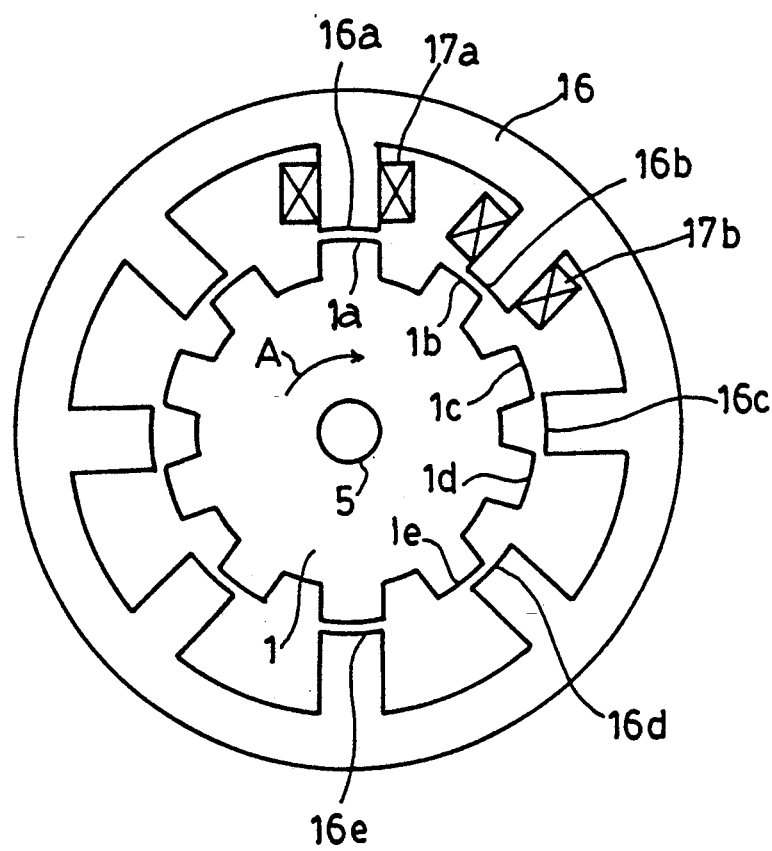

FIG. 1 (a) is an example of the three-phase reluctance-type motor to which this invention is applied, and is a plan view showing the structure of the salient poles of the rotor, the magnetic poles of the stationary armature and the armature coils.

The width of salient poles 1a, 1b, ... 1g of rotor 1 is 180 degrees, and they are disposed with a phase difference of 360 degrees and an equal pitch.

Rotor 1 consists of a well-known means of laminating silicon steel plates, with rotating shaft 5 as its axis.

In stationary armature 16, magnetic poles 16a, 16b, 16c, 16d, 16e, 16f, $\overline{16a}$, $\overline{16b}$, ... $\overline{16f}$ are disposed having a width of 180 degrees and at an equal spacing angle.

The widths of salient poles 1a, 1b, ... 1g of and magnetic poles 16a, ... 16f are 180 degrees and equal. The number of salient poles is 14, and the number of the magnetic poles is 12.

Figure 2:
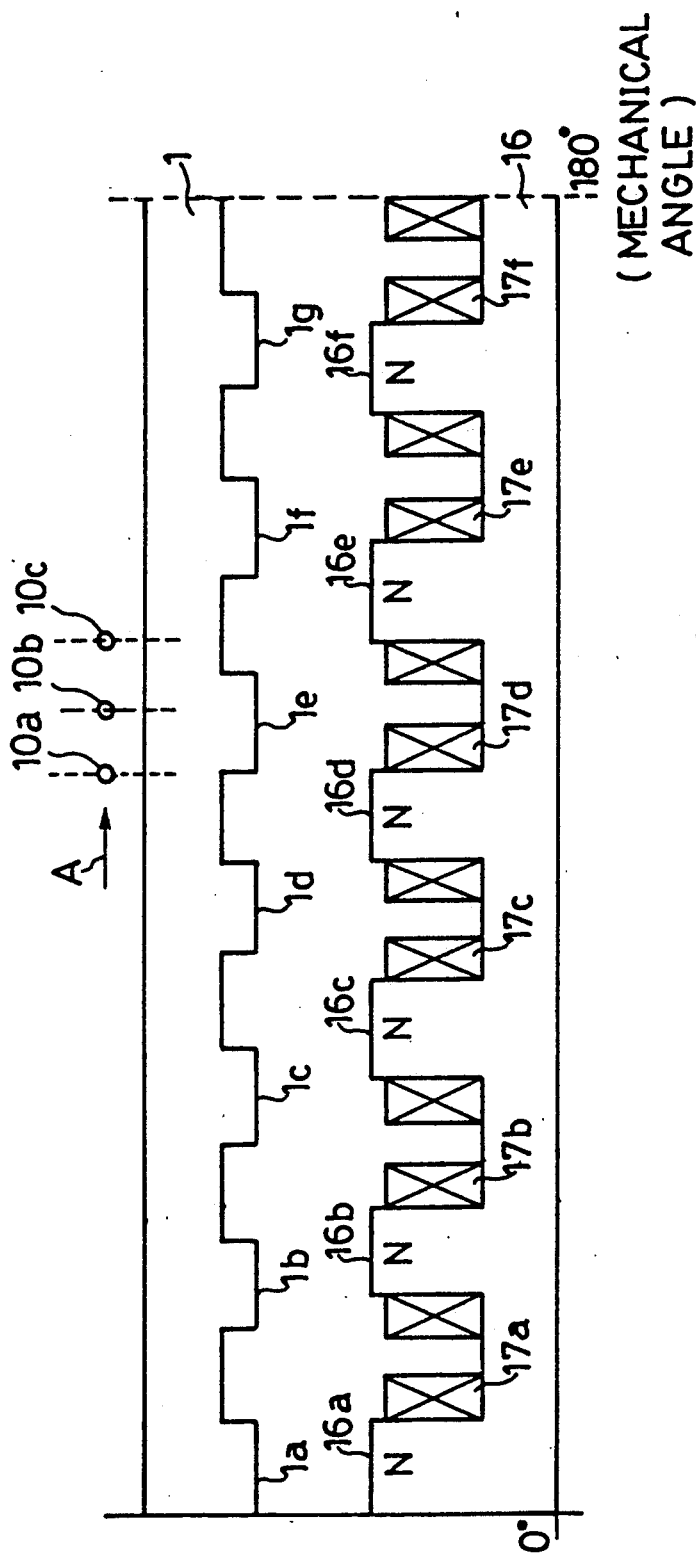
FIGS. 2(a) and 2(b) are diagrams of a development the rotor, magnetic poles and armature coils of the three-phase and two-phase motors.
Figure 2:
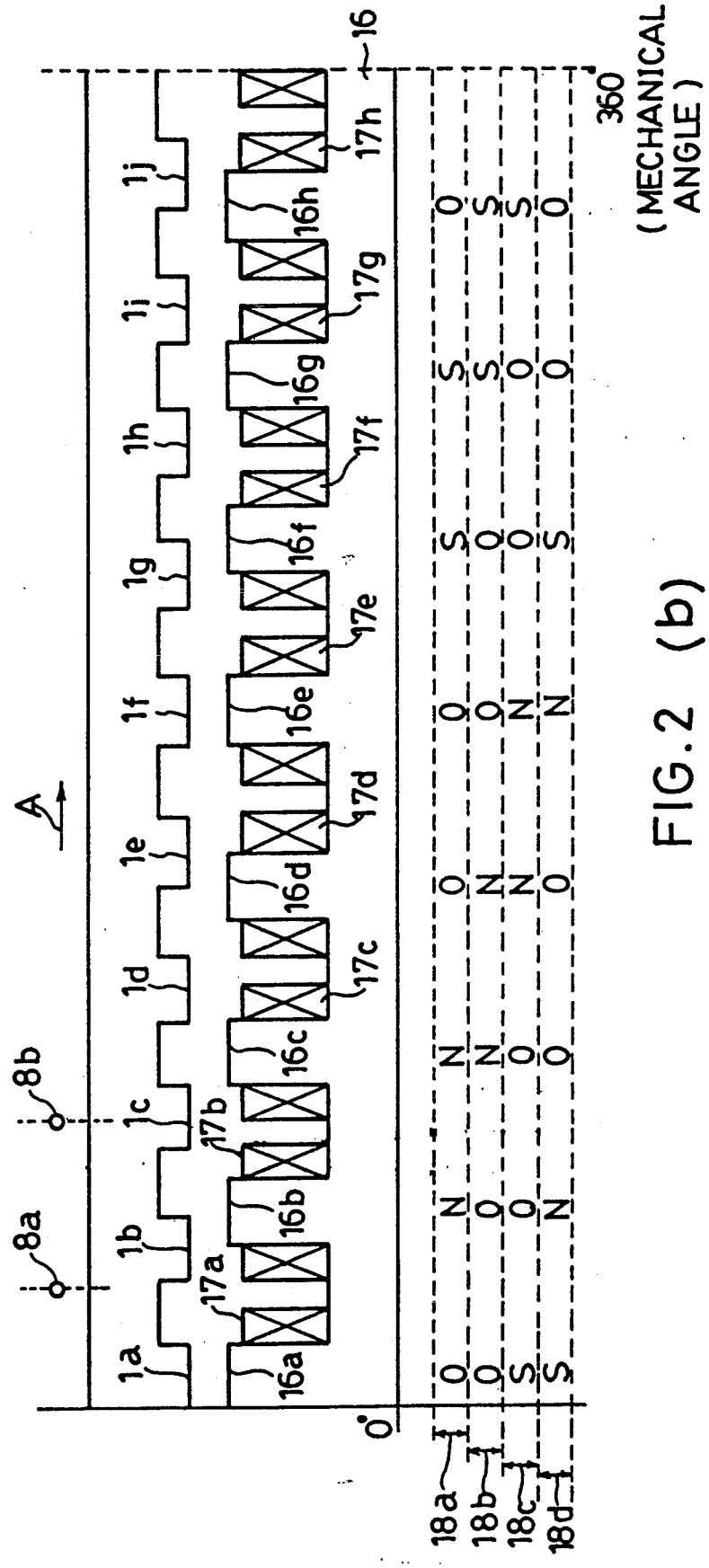

FIG. 2 (a) is a diagram of development of the reluctance-type three-phase motor in FIG. 1 (a), and is shown up to 180 degrees in mechanical angle with the remainder being omitted.

Salient poles $\overline{1a}$, $\overline{1b}$, ... and magnetic poles $\overline{16a}$, $\overline{16b}$, ... in FIG. 1 (a) are omitted, but these are at positions which are axially symmetrical with salient poles 1a, 1b, ... and magnetic poles 16a, 16b, ... respectively. Consequently the magnetic attraction forces in the radial direction are balanced, producing an action that the generation of mechanical vibrations and the pressing force to bearings are made very small.

Coils 10a, 10b and 10c in FIG. 2 (a) are position detecting elements for detecting the positions of salient poles 1a, 1b, ... which are fixed at the stationary armature 16 side in the positions shown, and the coil faces are opposed to the sides of salient poles 1a, 1b, ... via an air-gap therebetween.

Coils 10a, 10b and 10c are spaced by 120 degrees, and they are air-core type coils having a 5 mm diameter and 100 turns.

Figure 4:
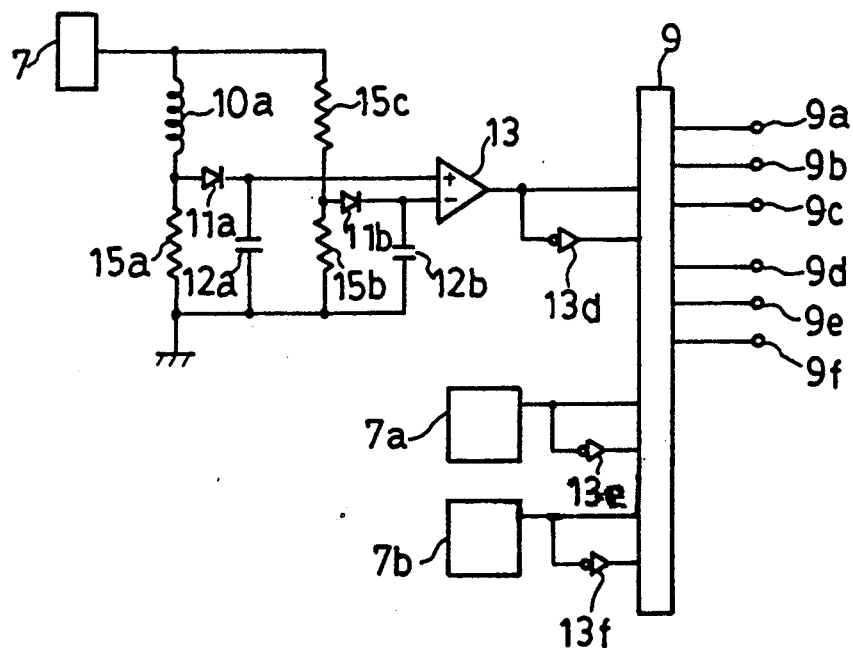

In FIG. 4, there is shown a device for obtaining position detecting signals from coils 10a, 10b and 10c.

Coil 10a and resistors 15a, 15b and 15c from a bridge circuit, which is adjusted so that it balances when coil 10a is not opposed to salient poles 1a, 1b, ...

The outputs of the low-pass filters formed by a diode 11a and capacitor 12a and of diode 11b and capacitor 12b are equal, and thus the output of operational amplifier 13 becomes a low level.

In oscillator 7, an oscillation of about 1 megacycle is performed. If coil 10a is opposed to salient poles 1a, 1b, . . . , impedance decreases because of iron loss (eddy-current loss plus hysteresis loss), and thus the voltage drop of resistor 15a becomes large, causing the output of operational amplifier 13 to be a high level.

Figure 7:
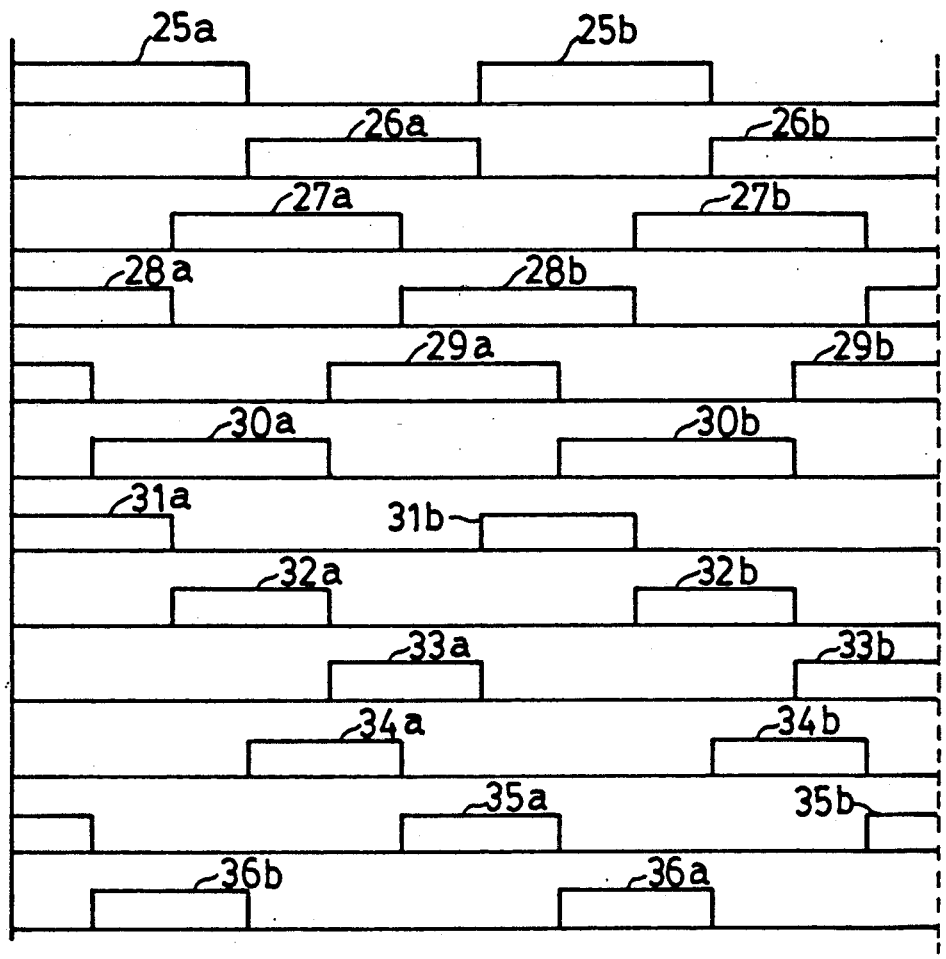
FIGS. 7(a) and 7(b) are time charts a time chart of the position detecting signals.
Figure 7:
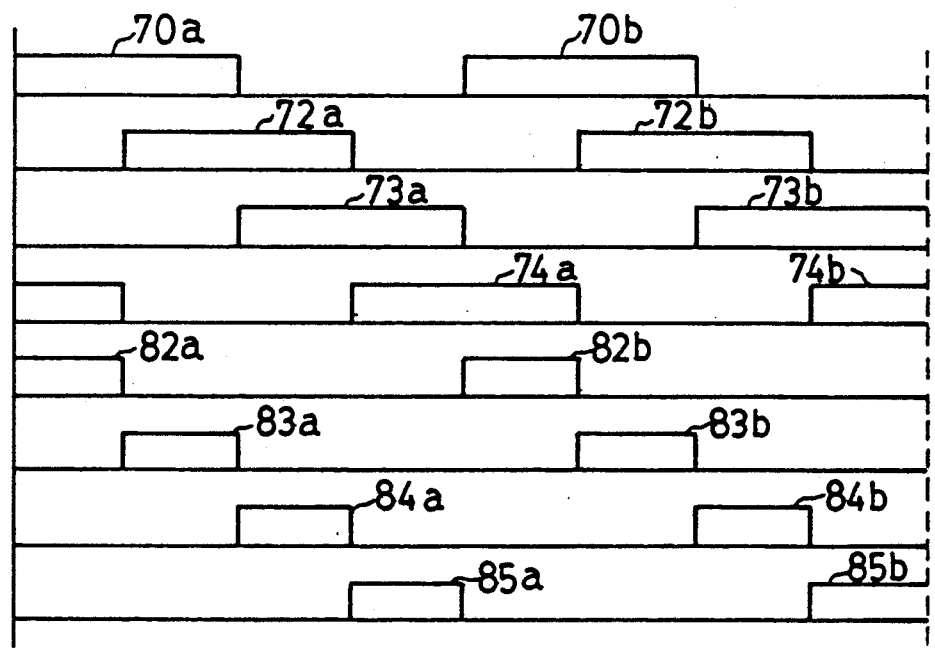

The inputs to block circuit 9 are curves 25a, 25b, . . . in the time chart of FIG. 7 (a), and the inputs through inverting circuit 13d are curves 26a, 26b, . . .

Block circuits 7a and 7b in FIG. 4 show such bridge circuit which include coils 10b and 10c, respectively.

Oscillator 7 can commonly be used.

The output of block circuit 7a and the output of inverting circuit 13e are inputted to block circuit 9, and the output signals designated as curves 27a, 27b, . . . and curves 28a, 28b, . . . , in FIG. 7 (a), respectively.

The output of block circuit 7b and the output of inverting circuit 13f are inputted to block circuit 9, and those signals are shown in FIG. 7 (a) as curves 29a, 29b, . . . and curves 30a, 30b, . . . , respectively.

Between curves 25a, 25b, . . . , curves 27a, 27b, . . . there is a in phase by 120 degrees, and between curves 27a, 27b, . . . , curves 29a, 29b, . . . there is a delay in phase by 120 degrees.

Block circuit 9 is a circuit which is commonly used by the control circuit of a three-phase, Y-connection semiconductor motor, and is a logical circuit by which electrical signals of rectangular waves having a width of 120 degrees are obtained from terminals 9a, 9b, 9c, . . . , 9f upon the inputting of the above-mentioned position detecting signals.

The outputs of terminals 9a, 9b and 9c are shown as curves 31a, 31b, . . . , curves 32a, 32b, . . . , and curves 33a, 33b, . . . , respectively.

The outputs of terminals 9d, 9e and 9f are shown as curves 34a, 34b, . . . , curves 35a, 35b, . . . , and curves 36a, 36b, . . . , respectively. The phase differences between the output signals of terminals 9a and 9b, between the output signals of terminals 9d and 9e, and between the output signals of terminals 9c and 9f are 180 degrees.

In addition, the output signals of terminals 9a, 9b and 9c are sequentially delayed by 120 degrees without being superposed, and the output signals of terminals 9d, 9e and 9f are sequentially delayed by 120 degrees as well.

The same effect is obtained by using an aluminium plate rotating synchronously with rotor 1 in FIG. 1 (a) and having the same shape instead of salient poles 1a, 1b, . . . opposing coils 10a, 10b and 10c.

A reluctance-type motor has the disadvantages stated below.

First, the torque is remarkably large in the initial stage in which salient poles start to oppose magnetic poles, and small in the final stage. Accordingly, there is a defect that the composite torque includes a large ripple torque. To remove such defect, for instance, the following means is effective.

That is, means is used for making the widths in the direction of the rotating shaft of the opposing faces of the salient and magnetic poles different from each other. If such means is employed, the output torque curves are made flat by the leakage fluxes of the opposing faces as shown by curves 14a, 14b, . . . 14d in FIG. 5 (c).

Curves 14d, 14c, 14b and 14a are examples of armature currents of 0.5 amperes, 1.0 ampere, 1.5 amperes and 2.0 amperes, respectively.

Consequently, by selecting the energization width of the armature coils and the point at which the energization starts, the output torque ripple can be removed.

This is one means of this invention. Second, there is a drawback that the efficiency degrades.

Figure 5:
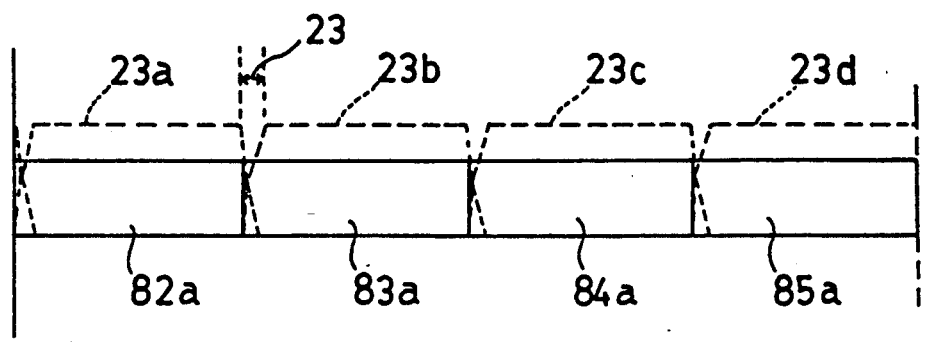
FIGS. 5(a)–5(c) are time charts a time chart of position detecting signal curves, armature currents and output torques.
Figure 5:
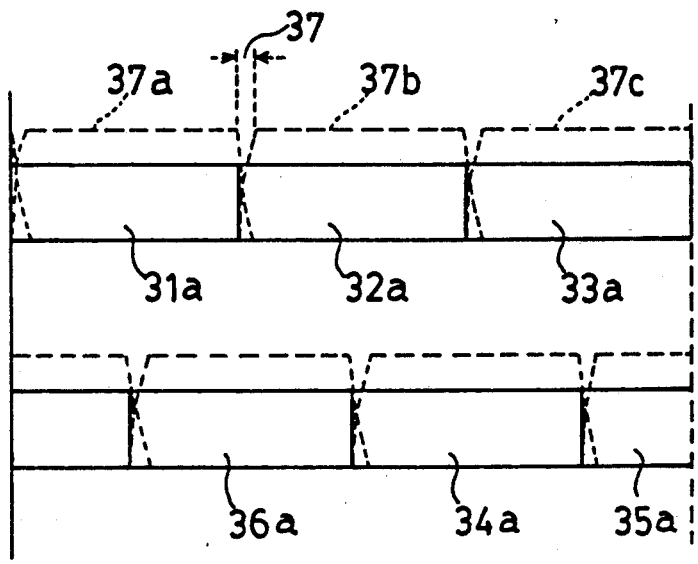
Figure 5:
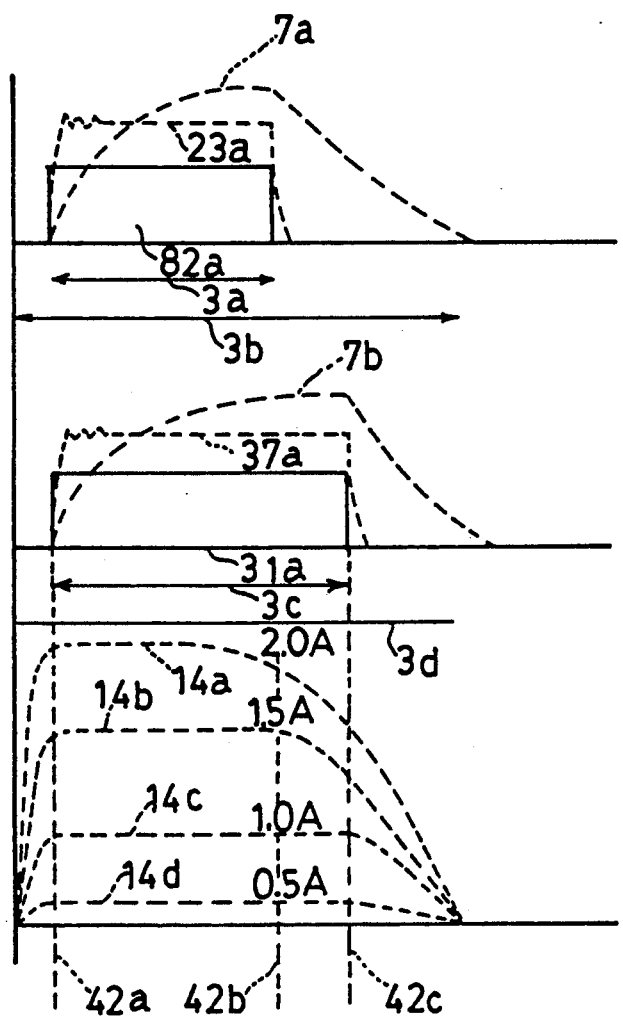

The width of position detecting signal 31a in the time chart of FIG. 5 (c), as indicated by arrow 3c, is 120 degree. When the energization of an armature coil is started at the beginning thereof, the rise is delayed by large inductance as shown by dotted line 7b. When the armature coil is de-energized at the end of the position detecting signal, the width of the falling portion becomes large because of the discharge of the large stored magnetic energy, as shown by the right end of dotted line 7b.

The torque decreases as the rise time becomes delayed, and if the falling portion exceeds the right end of arrow 3d indicating a width of 180 degrees, a counter-torque is caused. Its effect becomes large when the speed is high.

Accordingly, the rotational speed becomes low, and the efficiency degrades for a high speed.

The present invention makes the rise and fall of the armature currents rapid for preventing the degradation of the efficiency at high speed.

Third, there is a disadvantage that the rotational speed becomes very small if the output torque is made large, that is, the number of salient and magnetic poles is increased to increase the exciting current.

Generally, in a reluctance-type motor, to enhance the output torque, it is required to increase the number of the magnetic and salient poles in FIG. 1 (a) and reduce the opposing air-gap between the two.

If, at this time, the number of revolutions is held at a required value, the rise gradient of the exciting current becomes relatively gentle because of the magnetic energy stored in magnetic poles 16a, 16b, . . . 16g, and salient poles 1a, 1b, . . . 1g in FIG. 1. Even if the energization is stopped, the time for the discharge current due to the magnetic energy to disappear is relatively prolonged and thus a large counter-torque occurs.

Under such circumstances, the peak value of the armature current becomes small and a counter-torque occurs, causing a disadvantage that the rotational speed becomes a small value.

In accordance with the means of this invention, the rise and fall of the armature current becomes rapid, by which the above described disadvantages are removed.

In the developments of FIGS. 1 (a) and 2 (a), circular portion 16 and magnetic poles 16a, 16b, . . . 16g are constructed by a well-known means of laminating and solidifying silicon steel plates, and they are fixed to outer casing 17 thereby to form the armature.

Magnetic core 16 forms a magnetic path. Magnetic core 16 and magnetic poles 16a, 16b, . . . 16b form the armature.

The salient poles are 14 in number, and have an equal width and spacing angle. The width of magnetic poles 16a, 16b, . . . 16g is equal to the salient pole width, and the 12 magnetic poles are disposed with an equal pitch.

When armature coils 17b 17c, $\overline{17b}$ and $\overline{17c}$ are energized, salient poles $\overline{1b}$, $\overline{1c}$, 1b and 1c are attracted and rotate in the direction of arrow A.

When they further rotate, armature coils "$\overline{17b}$" and 17b are de-energized and armature coils 17d and $\overline{17d}$ are energized, so that a torque by salient poles $1d$ and $\overline{1d}$ occurs.

Each time rotor 1 rotates by 60 degrees, the energization mode of armature coils is changed, and the excited magnetic poles of the magnetic poles are cyclically altered: magnetic poles $16b$, $\overline{16b}$ (N-, S-poles), $16c$, $\overline{16c}$ (N-, S-poles) →magnetic poles $16c$, $\overline{16c}$ (N-, S-poles), $16d$, $\overline{16d}$ (N-, S-poles) →magnetic poles $16d$, $\overline{16d}$ (N-S-poles), $\overline{16e}$, $\overline{16e}$ (N-, S-poles) →magnetic poles $16e$, $16e$ (N-, S-poles), $16f$, $\overline{16f}$ (N-, S-poles) →$\overline{16f}$, $16f$ (N-, S-poles), $16a$, $\overline{16a}$ (N-, S-poles). This provides a three-phase reluctance motor in which rotor 1 is driven in the direction of arrow A.

Since two magnetic poles to be excited are always heteropolar, the magnetic fluxes passing through the unexcited magnetic poles are of the directions opposite to each other, whereby the generation of a counter-torque is prevented.

The means for energizing armature coils $17a$, $\overline{17a}$, $17b$, $\overline{17b}$, ... is now described.

Armature coils $17a$ and $\overline{17a}$ are connected in series or in parallel. Armature coils $17b$ and $\overline{17b}$ and the other armature coils $17c$, $\overline{17c}$, ... $17f$, $\overline{17f}$ are also connected in a similar manner.

Figure 6:
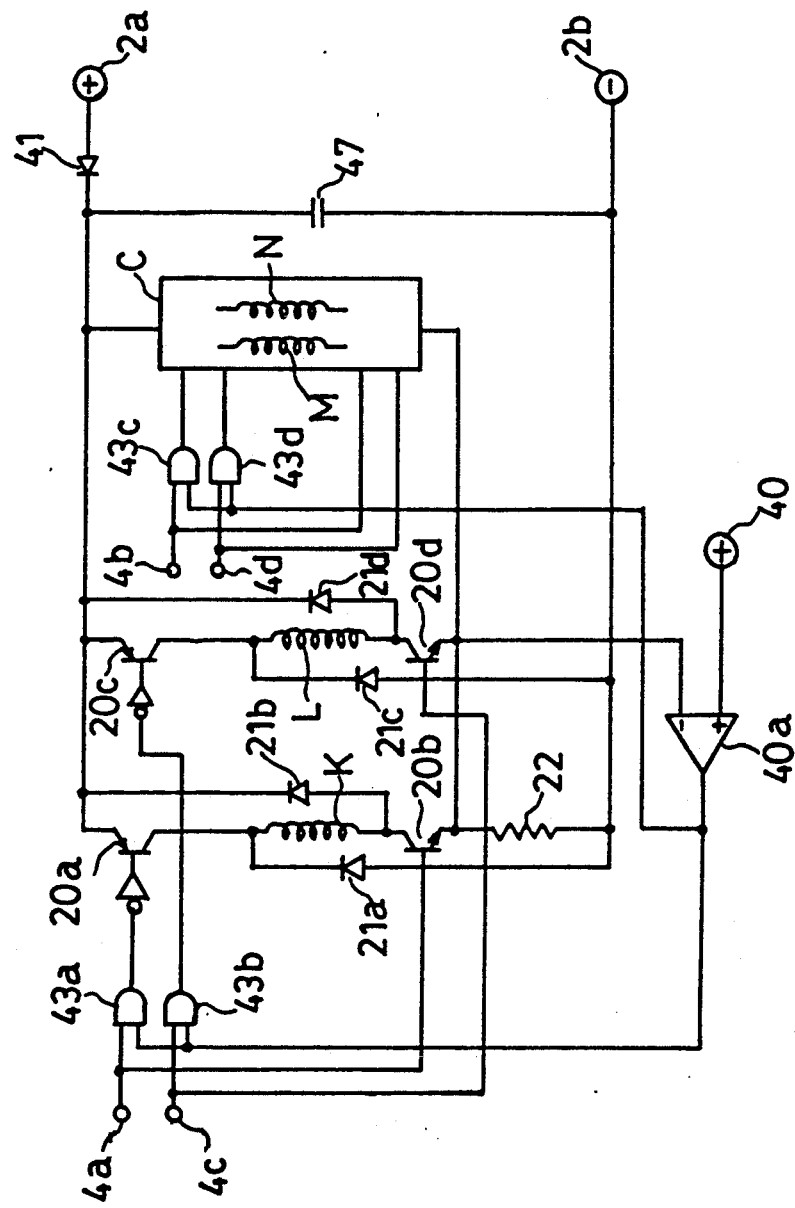
FIGS. 6(a) and 6(b) are circuit diagrams of an energization control circuit of the armature coils.
Figure 6:
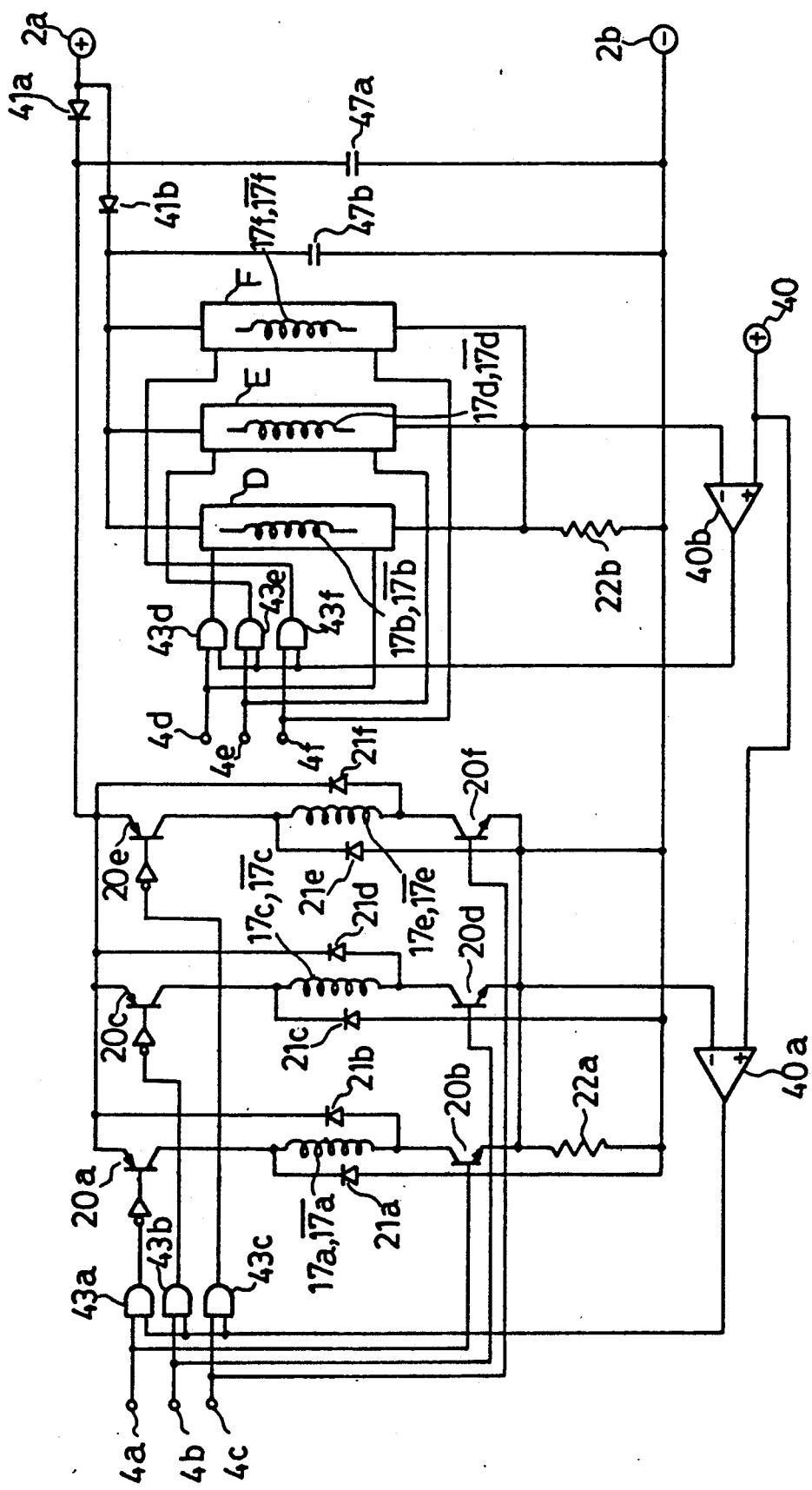

In FIG. 6 (b), at both ends of armature coils $17a$, $\overline{17a}$, $17c$, $\overline{17c}$, $17e$ and $\overline{17e}$, transistors $20a$ and $20b$, $20c$ and $20d$, and $20e$ and $20f$ are inserted, respectively.

Transistors $20a$, $20b$, $20c$, ... $20f$ act as switching elements. Other semiconductors having the same effect may be employed instead of them.

Power is supplied from the positive and negative terminals $2a$ and $2b$ of a D.C. power supply.

If the lower input of AND circuit $43a$ is a high level, transistors $20a$ and $20b$ conduct when a high level electrical signal is inputted from terminal $4a$, thereby energizing armature coils $17a$ and $\overline{17a}$.

If high level electrical signals are inputted from terminals $4b$ and $4c$, transistors $20c$ and $20d$ transistors $20e$ and $20f$ conduct, thereby energizing armature coils $17c$, $\overline{17c}$, $17e$ and $\overline{17e}$.

Block circuits D, E and F are the energization control circuits for armature coils $17b$, $\overline{17b}$ and $17d$, $\overline{17d}$ and $17f$, $\overline{17f}$, and have the same structure as that of the energization control circuit for armature coil $17a$, $\overline{17a}$.

Accordingly, if high-level inputs are provided to terminals $4d$, $4e$ and $4f$ when the lower inputs of AND circuits $43d$, $43e$ and $43f$ are at a high level, armature coils $17b$, $\overline{17b}$ and $17d$, $\overline{17d}$ and $17f$, $\overline{17f}$ are energized, respectively.

Terminal 40 is a reference voltage for specifying the armature current. By changing the voltage of terminal 40, the output torque can be changed.

When the power supply switch (not shown) is turned on, the output of operational amplifier $40a$ becomes a high level because the −terminal of operational amplifier $40a$ is lower than the +terminal, and transistors $20a$, $20b$, ... , $20f$ in turn conduct, whereby a voltage is applied to the energization control circuits for armature coils $17a$, $\overline{17a}$, $17c$, $\overline{17c}$, $17e$ and $\overline{17e}$. Resistors $22a$ and $22b$ are resistors for detecting the armature currents of armature coils $17a$, $\overline{17a}$, $17c$, $\overline{17c}$, $17e$ and $\overline{17e}$ and $17b$, $\overline{17b}$, $17d$, $\overline{17d}$, $17f$, $\overline{17f}$, respectively.

The situation is completely the same for operational amplifier $40b$. A voltage is applied to block circuits D, E and F simultaneously with the turn-on of the power supply.

The input signals to terminal $4a$ are position detecting signals $31a$, $31b$, ... in FIG. 7 (a), and the input signals to terminals $4b$ and $4c$ are position detecting signals $32a$, $32b$, ... and $33a$, $33b$, ... , respectively.

The above-mentioned curves are shown by the same symbols in the time chart of FIG. 5 (b). Curves $31a$, $32a$, $33a$, ... are contiguous.

In addition, position detecting signals $36a$, $36b$, ... , $34a$, $34b$, ... , and $35a$, $35b$, ... are inputted to terminals $4d$, $4e$ and $4f$ in FIG. 6 (b), respectively.

In FIG. 5 (b), curves $36a$ (same as $36b$), $34a$, $35a$, ... are shown and they are continuing without being superposed.

An explanation is provided for the case where the position detecting signal curve $31a$ of FIG. 5 (b) is inputted to terminal $4a$ of FIG. 6 (b).

Position detecting signal $31a$ is shown by the same symbol in FIG. 5 (c).

The armature current increases as shown by dotted line $7b$. Because of large inductance in a reluctance-type motor, the rise of dotted line $7b$ at the beginning of curve $31a$ is slow.

It is therefore necessary to increase the applied voltage to terminal $2a$. Since the width of curve $31a$ decreases as the speed becomes high, a higher voltage should be used accordingly as the voltage of terminal $2a$.

When the armature current exceeds a preset value (specified by the reference voltage of terminal 40 in FIG. 6 (b)), the output of operational amplifier $40a$ becomes a low level, and thus the output of AND circuit $43a$ becomes a low level, whereby transistor $20a$ is turned off.

Accordingly, the magnetic energy stored in armature coils $17a$ and $\overline{17a}$ is discharged through diode $21a$, transistor $20b$ and resistor $22a$, and when the discharge current decreases to a predetermined value, the output returns to a high level again by the hysteresis characteristics of operational amplifier $40a$, and transistors $20a$ and $20b$ turn on again, thereby increasing the armature current.

When the armature current increases to the preset value restricted by reference voltage 40, the output of operational amplifier $40a$ becomes a low level, and transistor $20a$ turns off, thereby decreasing the armature current. A chopper circuit repeating such cycle is provided, and the section indicated of by arrow $3c$ in FIG. 5 (c) is passed.

At the end of curve $31a$, the input to terminal $4a$ in FIG. 6 (b) disappears. Consequently, since both transistors $20a$ and $20b$ turn off, the magnetic energy stored in armature coil $17a$ and $\overline{17a}$ is discharged in a sequence of diode $21b$→capacitor $47a$→resistor $22a$→diode $21a$, thereby charging capacitor $47a$.

At this time, however, position detecting signal curve $32a$ of FIG. 5 (b) has already been inputted to terminal $4b$ of FIG. 6 (b), and thus the stored magnetic energy of armature coils $17a$ and $\overline{17a}$ changes to the magnetic energy of armature coils $17c$ and $\overline{17c}$, thereby making the rise of the armature current (the left end of dotted line $37b$ of FIG. 5 (b)) rapid.

Capacitor $47a$ is effective when there are timing differences in turn-on and turn-off transistors, but it is not always necessary.

The width of arrow 37 indicates the width of the fall and rise of dotted lines $37a$ and $37b$. If the width of arrow 37 exceeds a predetermined angle, a counter-torque occurs and the torque also decreases. Since the widths of curves $32a$ and $33a$ become small as the speed becomes high, the width of arrow 37 also needs to be made small accordingly. This object is accomplished by diode 41a preventing the stored magnetic energy of armature coils 17a and $\overline{17a}$ from flowing into power supply 2a, and 2b.

If there is no diode 41a and the magnetic energy of armature coils 17a and $\overline{17a}$ flows into the power supply, the width of the falling portion of dotted line 37a becomes large and the applied voltage to armature coils 17c and $\overline{17c}$ also equals the voltage of power supply 2a, and 2b, so that the width of the rising portion of the dotted line also becomes large.

Accordingly, a high speed motor can be obtained. It is of course possible to accomplish the same object by increasing the power supply voltage, but this means results in a high-voltage power supply which has a problem in practical use, and thus the means according to this invention is effective.

In order to obtain a speed of 10,000 revolutions per minute for a motor having an output of 300 watts, a voltage of the order on 150 volts is required for terminals 2a and 2b if there is no diode 41a. The use of diode 41a provides an action and effect such that the voltage only needs to be 60 volts.

In this case, the width of arrow 37 is about 20 microseconds according to actual measurement, and there is an effect that a rotational speed faster than 100,000 revolutions can be obtained. In this instance, the applied voltage becomes a high voltage due to a counter-electromotive force.

Further, to increase the output torque, it is only needed to increase the voltage of reference voltage 40 in FIG. 6 (b).

As described above, the apparatus of this invention is characterized in that the limit of high-speed rotation and the output torque are independently controlled by the applied voltage and the reference voltage (the command voltage of the output voltage), respectively.

The control of the control current by the position detecting signals of armature coils 17c and $\overline{17c}$ changes by the chopper action of operational amplifier 40a and AND circuit 43b in FIG. 6 (b) in response to turn-on/off of transistor 20c, as shown by dotted line 37b of FIG. 5 (b), and rapidly falls at the end of curve 32a as shown by a dotted line.

Then, when position detecting signal 33a is inputted to terminal 4c in FIG. 6 (b), the energization of armature coils 17e and $\overline{17e}$ is similarly performed.

As stated above, the armature coils are sequentially energize to generate an output torque.

The above-mentioned energization mode is referred to as the energization mode of the A-phase.

Position detecting signals 36a, 36b, . . . , 34a, 34b, . . . , and 35a, 35b, . . . in FIG. 7 (a) are inputted to terminals 4d, 4e and 4f in FIG. 6 (b), respectively, to thereby control the energization of armature coils 17b, $\overline{17b}$, 17d, $\overline{17d}$, 17f, $\overline{17f}$ included in block circuits D, E and F.

In FIG. 5 (b), curves 36a, 34a and 35a are shown. These are adjoining curves each having a width of 120 degrees and delayed in phase by 60 degrees from the upper curves.

The dotted line portions of curves 36a, 34a and 35a represent armature currents. The widths of the rising and falling portions are restricted by diode 41b and capacitor 47b as in the energization mode of the A-phase.

In addition, the chopper control of the intermediate portion of each curve by AND circuits 43d, 43e and 43f, operational amplifier 40b and reference voltage terminal 40 is also similar to the energization mode of the A-phase. The action and effect is similar as well.

The energization control of armature coils 17b, $\overline{17b}$, 17d, $\overline{17d}$, 17f, $\overline{17f}$ by curves 36a, 36b, . . . , 34a, 34b, . . . and 35a, 35b, . . . is referred to as the energization mode of the B-phase.

Although, in a three-phase motor such as this embodiment, the energization modes of the first, second and third phases are general expressions, they are divided into two in this specification and referred to as the energization modes of the A-phase and B-phase.

Because of the energization modes of the A-phase and B-phase, only two sets of chopper circuits for armature current control are needed, and the use of diodes 41a and 41b can make the extinguishment and increase of the magnetic energy of armature coils rapid, providing an effect that a high-speed motor is obtained as previously described. Means for removing the ripple of the output torque is described below.

In FIG. 5 (c), as stated before, the torque curves of the individual armature coils in the constant-current energization of 180 degrees are shown as curves 14a, 14b, . . .

The fixing positions of coils 10a, 10b and 10c of FIG. 2 (a) which are position detecting elements are adjusted so that the beginning of position detecting signal curve 31a of FIG. 5 (c) is set to the point of dotted line 42a, that is, the point at which the torque curve starts to be flat.

The end of curve 31a is the point of dotted line 42c, and the section between dotted lines 42a and 42c is the energization section of armature coils 17a, $\overline{17a}$.

As previously stated, since the rise and fall of the energization curve are rapid, the output torque becomes flat.

Although the torque decreases at the final stage of the energization if curve 14a and the armature current are large, the flatness of the output torque becomes better as the armature current is smaller.

The above described circumstances are completely the same for the output torques of the corresponding armature coils by other position detecting coils.

There is therefore an effect that the torque ripple of the composite torque is removed.

If used as a servo motor, it is in the vicinity of the stop point of a load that flatness is required.

At this time, the output torque has decreased and thus the armature current is small and the torque curves of the energization currents below curves 14a and 14b of FIG. 5 (c) are applied, so that the torque becomes flat.

Since the energization section of armature coils is also the section of the maximum value of the torque, the efficiency is also good.

As to the shapes of torque curves 14a, 14b, . . . 14d, the characteristics and section of the flat portion of the torque can be altered by changing the shapes of the opposing magnetic poles and salient poles, and thus the position of the dotted line 42a needs to be changed accordingly.

According to the common means, the width between dotted line 42a and the beginning of the torque curve is 10 to 20 degrees.

As understood from the above description, position detecting signal curves 31a, 31b, . . . curves 32a, 32b, . . . and curves 33a, 33b, . . . in FIG. 7 (a) perform the energization control of a width of 120 degrees of armature coils 17a, $\overline{17a}$, 17c, $\overline{17c}$, 17e, $\overline{17e}$, and position detecting signal curves 36a, 36b, . . . , curves 34a, 34b, . .

and curves 35a, 35b perform the energization control of a width of 120 degrees of armature coils 17b, 17b, 17d, 17d, 17f, 17f.

Since it is only the reference voltage (the voltage of terminal 40 of FIG. 6 (b) that specifies the output torque or armature current value, the applied voltage ripple has no effect.

Accordingly, the ripple voltage of power supply terminals 2a and 2b in FIG. 6 (b) is not related so much, and thus a capacitor having a small capacitance may be used for rectification. The rectifying capacitor has an even smaller capacitance for a three-phase A.C. power supply, thereby providing a characteristic feature that the power supply can be simplified.

The above described circumstances are the same for the rectifying capacitor in the later described embodiment as well.

Next, a description provided with respect to a two-phase reluctance-type motor.

FIG. 1 (b) is a plan view of a two-phase reluctance-type motor, and FIG. 2 (b) is a development of the salient poles, magnetic poles and armature coils thereof.

In FIG. 1 (b), circular portion 16 and magnetic poles 16a, 16b, ... 16e are made by a well-known means for laminating and solidifying silicon steel plates, and are fixed to an outer casing, not shown, to form an armature. Magnetic core 16 is a magnetic path.

Armature coils 17a and 17b are wound around magnetic poles 16a and 16b. Other armature coils are omitted and not shown.

By a bearing provided in the outer casing, rotating shaft 5 is supported for rotation, to which rotor 1 is fixed.

On the outer periphery of rotor 1, salient poles 1a, 1b, ... 1e are provided and opposed to magnetic poles 16a, 16b, ... 16e with an air-gap of about 0.1 to 0.2 millimeters therebetween. Rotor 1 is also made by the same means as armature 16. The development of this is shown in FIG. 2 (b).

In FIG. 2 (b), the salient poles are 10 in number, and have an equal width and spacing angle.

The width of magnetic poles 16, 16b, ... 16e is equal to the width of the salient poles, and eight magnetic poles are disposed with an equal pitch.

When armature coils 17b, 17f, 17c and 17g are energized, salient poles 1b, 1g, 1c and 1h are attached and rotate in the direction of arrow A.

When they further rotate, the energization of armature coils 17b and 17f is stopped and armature coils armature coils 17d and 17h are energized, whereby a torque by salient poles 1d and 1i are generated.

Arrow 18a shows an exciting polarity of rotating by 90 degrees from the state as shown, and magnetic poles 16b and 16c become the N-pole and magnetic poles 16f and 16g become the S-pole. The magnetization of such polarities makes the counter-torque due to magnetic flux leakage small.

During the next rotation of 90 degrees or arrow 18b, the individual magnetic poles take the N- and S-poles as shown. "O" represents unexcited ones.

In the next rotation of 90 degrees and the subsequent rotation of 90 degrees, magnetization is made to the polarities shown by arrows 18c and 18d.

By the above described excitation, rotor 1 rotates in the direction of arrow A, providing a two-phase motor.

The width between the individual magnetic poles is 1.5 times the salient pole width.

In addition, since the space in which the armature coils are mounted is large, a thick wire can be utilized to provide an effect that copper loss is reduced for increasing the efficiency.

Since a reluctance-type motor has no field magnet, it is required to increase the magnetic flux generated by the magnetic poles even to cover the magnetic flux by the field magnet. Accordingly, the large space between the magnetic poles is important.

The number of magnetic poles in FIG. 2 (b) is 10, which is larger than the conventional well-known rotor of this type. Consequently, a counter-torque is generated by the discharge of the magnetic energy stored in the individual magnetic poles by excitation and the output torque becomes large, but there remains a problem of reduction in the rotational speed, thereby making it impossible to put it to practical use.

In accordance with the means of this invention, however, the above stated inconvenience is removed and only the effect of increasing the output torque is added. Details are described later on.

The description of the generation of the driving torque of rotor 1 provided above is for an armature coil energization angle of 180 degrees. The present invention uses an energization angle of 90 degrees, but the rotation principle is completely the same.

In FIG. 6 (a), armature coils K and L represent armature coil 17a, 17e and 17c, 17g in FIG. 2 (b), respectively, and the two sets of armature coils are connected in series or parallel.

At both ends of armature coils K and L, transistors 20a, 20b and 20c, 20d are inserted, respectively.

Transistors 20a, 20b, 20c and 20d act as switching elements. Other semiconductor elements having the same effect may be used instead.

Power is supplied from the positive and negative terminals 2a and 2b of a D.C. power supply. When a high-level electrical signal is inputted from terminal 4a, transistors 20a and 20b conduct, whereby armature coil K is energized.

When a high-level electrical signal is inputted from terminal 4c, transistors 20c and 20d conduct, whereby armature coil L is energized.

The means for obtaining position detecting signals is now described.

Coil 8a and 8b in FIG. 2 (b) have the same construction as coil 10a in FIG. 2 (a), and are fixed to the armature side so as to oppose the side faces of salient poles 1a, 1b, ... 1j.

Coils 8a and 8b are opposed to the side faces of salient poles 1a, 1b, ... 1j through an air-gap as shown in FIG. 2 (b), and this arrangement makes the impedance of the coils small because of iron loss (which includes eddy-current loss, and this loss is large). Coils 8a and 8b are spaced apart by (360+90) degrees.

Figure 3:
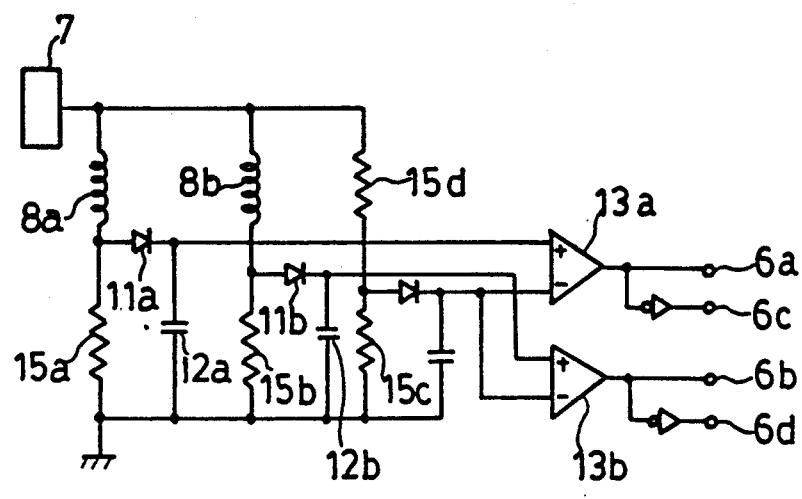
FIGS. 3 and 4 are electric circuits for obtaining position detecting signals from the coils.

In FIG. 3, an arrangement for obtaining position detecting signals from coils 8a and 8b is shown.

Coils 8a and 8b, and resistors 15a, 15b, 15c and 15d form a bridge circuit.

The output frequency of oscillator circuit 7 is about 1 megacycle.

Coils 8a and 8b are air-core coils which are fixed to the stationary armature side, and when opposed to salient poles 1a, 1b, ... 1j in FIG. 2 (b), their impedance decreases because of eddy-current loss and the voltage drop of resistor 15a increases.

When coil 8a faces a salient pole, an electrical signal smoothed by a low-pass filter including a diode 11a and capacitor 12a is inputted to the +terminal of operational amplifier 13a.

Also, for the voltage drop in resistor 15b, an electrical signal which was changed to a d.c. current by a low-pass filter consisting of diode 11b and capacitor 12b is inputted to the +terminal of operational amplifier 13b. Since an adjustment was previously made so that the bridge circuit balances when coils 8a and 8b are not facing salient poles, the outputs of operational amplifiers 13a and 13b do not exist at this time.

When coil 8a faces a salient pole, the output of operational amplifier 13a is a rectangular wave output having a width of 180 degrees, and such signal is shown in the time chart of FIG. 7 (b) as curves 70a, 70b, . . .

The voltage drop in resistor 15c is inputted to the— terminals of operational amplifiers 13a and 13b. The output of terminal 6a becomes the above described curves 70a, 70b, . . . , and the output of terminal 6b becomes curves 72a, 72b, . . . , and the width of each curve is 180 degrees.

The outputs of terminals 6c and 6d through an inverting circuit are curves 73a, 73b, . . . and curves 74a, 74b, . . .

When the superposed portions of the signals of curves 70a, 70b, . . . and curves 74a, 74b, . . . in FIG. 7 (b) are obtained by an AND circuit, curves 82a, 82b, . . . are obtained.

Also for curves 72a, 72b, . . . and curves 70a, 70b, . . . , curves 83a, 83b, . . . are obtained by the same means.

By similar means, curves 84a, 84b, . . . are obtained from curves 72a, 72b, . . . and 73a, 73b, . . . , and curves 85a, 85b, . . . from curves 73a, 73b, . . . and curves 74a, 74b.

The above position detecting signals are used for the circuit of FIG. 6 (a).

Now, the armature coils controlled for energization by the above described two-phase position detecting signals are described according to FIG. 6 (a).

As stated above, armature coils K and L are armature coils 17a, 17e and 17c, 17g. Block circuit c is an energization control circuit including armature coils M and N, and has the completely same construction as those of armature coils K and L.

Armature coils M and N indicate a series or parallel connecting body of armature coils 17b and 17f, and a similar connecting body of armature coils 17d and 17h, respectively.

The above-mentioned position detecting signal curves 82a, 82b, . . . , curves 83a, 83b, . . . , curves 84a, 84b, . . . and curves 85a, 85b, . . . in FIG. 7 (b) are inputted from terminal 4a, 4b, 4c and 4d, respectively.

Accordingly, each of the armature coils is energized for 90 degrees in the sequence of armature coil K→M→L→N. Position detecting signal curves 82a, 83a, 84a and 85a are shown in FIG. 5 (a) by the same symbols.

In FIG. 6 (a), if the position detecting signal of curve 82a is inputted from terminal 4a when the power is turned on, transistors 20a and 20b conduct, whereby armature coil K starts to be energized. This curve is shown in FIG. 5 (a) as dotted line 23.

Accordingly, if a voltage drop occurs in resistor 22 and exceeds the voltage of reference voltage 40 which is the input to the + terminal of operational amplifier 40a, the output of operational amplifier 40a goes to a low level and, in turn, the output of AND circuit 43a also changes to a low level, so that transistor 20a turns off.

Since transistor 20b is conducting, the magnetic energy stored in armature coil K is discharged via diode 21a and resistor 22.

When the voltage drop in resistor 22 decreases and exceeds a predetermined value, the output of operational amplifier 40a returns to a high level because of its hysteresis characteristics. Consequently transistor 20a turns on again and the armature current increases. When the current restricted by reference voltage 40 is exceeded, transistor 20a turns off again.

A chopper circuit repeating such cycle is constructed. Since both transistors 20a and 20b turn off at the end of position detecting signal 82a, the stored magnetic energy of armature coil K charges capacitor 47 via diodes 21a and 21b.

Since the applied voltage of armature coil M to be energized is increased next by that charging voltage, the energizing current rapidly rises. At this time, a voltage is applied to armature coil M by position detecting signal curve 83a of FIG. 5 (a), which is inputted to terminal 43b.

Capacitor 47 may be a capacitor having a small capacitance. With a capacitor having a small capacitance, the charging current rises more rapidly and the rise of the energization of armature coil M becomes more rapid, and simultaneously the width of the falling portion of armature coil K (the width of arrow 23 in FIG. 5 (a)) can be made small.

Since a counter-torque and reduction torque occur when the width of arrow 23 exceeds a predetermined value, there is an action and effect that a high-speed motor is provided by making the width of arrow 23 small.

It is considered that the conversion of the stored magnetic energy of armature coil K to the magnetic energy of armature coil M makes the width of arrow 23 small.

Diode 41 prevents the stored magnetic energy from flowing into the power supply and eliminating the above described action.

Even if capacitor 47 is removed, the above-mentioned magnetic energy conversion can be performed more rapidly. The energization of armature coil M is performed in a manner similar to armature coil K by operational amplifier 40a, AND circuit 43.

A chopper action providing a current value restricted by reference voltage 40 is attained.

The pulsating current portion of the armature current by the chopper action is omitted and not shown.

Also, when position detecting signals 84a and 85a of FIG. 5 (a) are inputted to terminals 4c and 4d, control of the armature current is similarly performed by AND circuits 43b and 43d and operational amplifier 40a, and the action and effect is also similar.

Accordingly, a torque of one direction is obtained and the motor rotates.

Dotted curves 23a, 23b, 23c and 23d of the time chart in FIG. 5 (a) are the armature current curves of armature coils K, M, L and N, respectively.

The width of arrow 23 can be made 20 microseconds for a motor of a 300-watt output, and thus a high-speed rotation can be achieved.

The reason for that is described below with reference to FIG. 5 (c).

Since the energization control of armature coils by position detecting signals 82a, 83a, . . . are all the same, the description is made only of position detecting signal curve 82a.

Since the inductance of armature coils is large as described above, if the energization is provided only for the width of arrow 3a, the rise delays as shown by dotted line 7a, and the width of the falling portion becomes remarkably large, so that torque decreases in the rise portion, and a counter-torque occurs if the falling portion exceeds the right end of arrow 3b of a width of 180 degrees.

Consequently, for a high-speed, the efficiency degrades and the output torque also decreases, and the device becomes non-practical.

According to the present invention, such non-practicability is obviated and a motor of 100,000 revolutions per minute can efficiently be obtained.

The widths of the rise and fall of an armature current become very small because of diode 41 in FIG. 6 (a), whereby an armature current shown by dotted line curve 23a is provided.

Accordingly, the occurrence of a reduction torque and a counter-torque is prevented, whereby a motor having a high speed and torque can be obtained.

A high torque is provided if the height of curve 23a is increased. To this end, it is only needed to apply a voltage exceeding the counter-electromotive force between terminals 2a and 2b as in the case of an ordinary D.C. motor.

The torque curves in the section of 180 degrees are shown by curves 14a, 14b, ... as in the previously described three-phase motor.

If the fixing positions of coils 8a and 8b which are position detecting elements are adjusted and fixed so that the beginning of curve 82a is the point of dotted line 42a, the point at which the armature current is ceased is the point of dotted line 42b.

The width of the section between dotted lines 42a and 42b is 90 degrees.

Accordingly, characteristics are provided that such the output torque is only the flat portions of torque curves 14a, 14b, ... and the composite torque also becomes flat.

In addition, because of the energization in the section of the maximum torque, there is an effect that the efficiency increases.

If there are air-gaps in the boundary of curves 82a, 83a, ..., an inconvenience occurs that the automatic start-up is not available. It is thus required that no air-gaps are included.

Although this embodiment is for a two-phase motor, the energization mode may be considered to be only the A-phase or the B-phase.

Also, it can be considered to be an energization mode of a same phase. Accordingly, there is a characteristic feature that the energization control circuit is simplified.

The same object can also be attained by providing diodes 41, 41a and 41b of FIGS. 6 (a) and (b) at the negative electrode 2b side of the power supply.

In FIGS. 6 (a) and (b), the same object can also be accomplished by performing chopper control by AND circuits 43a, 43b, ... 43f and operational amplifiers 40a and 40b connected to the lower transistors 20b, 20d and 20f.

The present invention is utilized for the drive source of industrial equipment as a highly efficient D.C. motor having a large output torque and small torque ripple, and particularly as a servo motor.

I claim:

1. A two-phase reluctance-type motor having armature coils of each phase energized with a fixed current, a torque becomes maximum in the vicinity of an electrical angle of 10 to 20 degrees when salient poles of the rotor start to enter magnetic poles and thereafter a flat torque is obtained only for a predetermined section, for removing ripple torque, comprising:

a position detecting unit including position detecting elements for detecting the positions of the salient poles, first, second, third and fourth single-phase position detecting signals are obtained including continuous position detecting signals having an electrical angle width of 90 degrees and not superposed in time;

semiconductor switching elements connected in series and connected to both ends of 1st, $\overline{1st}$, and 2nd and $\overline{2nd}$ armature coils when armature coils of first and second phases are formed into said 1st and $\overline{1st}$ armature coils and said 2nd and $\overline{2nd}$ armature coils, respectively;

diodes, reversely connected to said respective semiconductor switching elements and said armature coils;

an energization control circuit, connected to said semiconductor switching elements, for making said semiconductor switching elements conductive by said 1st, 2nd, 3rd and 4th position detecting signals to energize said 1st, 2nd, $\overline{1st}$ and $\overline{2nd}$ armature coils, thereby generating an output torque in one direction;

a D.C. power supply for supplying power to said energization control circuit via a diode forwardly inserted in a positive or negative electrode side of said D.C. power supply;

means for adjusting fixing positions of said position detection elements to initiate the energization of each of said armature coils from the vicinity where the torque becomes maximum;

a chopper circuit for holding the armature current at a preset value; and an electric circuit which, when said armature coil controlled for energization by a position detecting signal is de-energized at the end of said position detecting signal, prevents the magnetic energy stored in said armature coil from being fed back to said D.C. power supply via the reversely connected diodes by means of one diode forwardly inserted in the power supply side, and converts said magnetic energy to the stored magnetic energy of said armature coil to be energized next, thereby making the rise and fall of the armature current rapid.

2. A three-phase reluctance-type motor including a rotor, when armature coils of each phase are energized with a fixed current, a torque becomes maximum in the vicinity of an electric angle of 10 to 20 degrees when salient poles of the rotor start to enter magnetic poles and thereafter a flat torque is obtained only for a predetermined section, for removing ripple torque, comprising:

a position detecting unit including position detecting elements for detecting the positions of the salient poles by A-phase position detecting signals having disposed therein continuous 1st, 2nd and 3rd position detecting signals having an electrical angle width of 120 degrees and not superposed in time are obtained, and by B-phase position detecting signals having disposed therein 4th, 5th and 6th position detecting signals that have an electrical angle phase difference of 60 degrees from the 1st, 2nd and 3rd position detecting signals;

semiconductor switching elements connected to both ends of 1st, $\overline{1st}$, 2nd, $\overline{2nd}$, 3rd and $\overline{3rd}$ armature coils corresponding to said armature coils of first, second and third phases, respectively;

diodes reversely connected to said respective semiconductor switching elements and said armature coils;

a first energization control circuit for energizing said semiconductor switching elements by said 1st, 2nd and 3rd position detecting signals to energize said 1st, 2nd and 3rd armature coils, respectively, thereby generating an output torque in one direction;

a second energization control circuit for making said semiconductor switching elements conductive by said 4th, 5th and 6th position detecting signals to energize said $\overline{1st}$, $\overline{2nd}$ and $\overline{3rd}$ armature coils, respectively, thereby generating a torque in the same direction;

a D.C. power supply for supplying power to said first and second energization control circuits via first and second diodes which are forwardly inserted in a positive or negative electrode side of said D.C. power supply;

means for adjusting fixing positions of said position detecting elements to initiate the energization of each of said armature coils from the vicinity where the torque becomes maximum;

a chopper circuit for holding the armature current at a preset value; and an electric circuit which, when said armature coils are energized by said 1st, 2nd and 3rd position detecting signals and are de-energized at the end of said position detecting signals, prevents the magnetic energy stored in said armature coils from being fed back to said D.C. power supply via said reversely connected diodes by means of said first diode, and converts said magnetic energy to the stored magnetic energy of said armature coil to be energized next, and which, when said armature coils are energized by said 4th, 5th and 6th position detecting signals and are de-energized at the end of said position detecting signals, prevents the magnetic energy stored in said armature coils from being fed back to said D.C. power supply via said reversely connected diodes by means of said second diode, and converts said magnetic energy to the magnetic energy of said armature coil to be energized next, thereby making the rise and fall of said armature current rapid.

* * * * *

UNITED STATES PATENT AND TRADEMARK OFFICE
CERTIFICATE OF CORRECTION

Page 1 of 5

PATENT NO. : 5,138,244
DATED : AUGUST 11, 1992
INVENTOR(S) : ITSUKI BAHN

It is certified that error appears in the above-identified patent and that said Letters Patent is hereby corrected as shown below:

Col. 1, line 35, "the" should be --an--;

line 56, "2nd and 2nd" should be --2nd and $\overline{2nd}$--;

line 58, "2nd and 2nd" should be --2nd and $\overline{2nd}$--;

line 64, "2nd, 1st" should be --2nd, $\overline{1st}$--;

line 65, "2nd" should be --$\overline{2nd}$--.

Col. 2, line 3, "the" (second occurrence) should be deleted;

line 31, "120 degrees an electrical angle of" should be --an electrical angle of 120 degrees--.

*Col. 4, line 7, "development" should be --development of--;

line 12, "a time chart" should be deleted;

line 17, "a time chart" should be deleted;

line 39, "of and" should be --and--;

line 66, "from" should be --form--.

Col. 5, line 15, "circuit" should be --circuits--;

line 26, "is a in" should be --is a delay in--.

UNITED STATES PATENT AND TRADEMARK OFFICE
CERTIFICATE OF CORRECTION

Page 2 of 5

PATENT NO. : 5,138,244
DATED : AUGUST 11, 1992
INVENTOR(S) : ITSUKI BAHN

It is certified that error appears in the above-identified patent and that said Letters Patent is hereby corrected as shown below:

Col. 6, line 11, "degree." should be --degrees.--;

line 65, "$\overline{1b}$, $\overline{1c}$, 1b and 1c" should be --1b, 1c, $\overline{1b}$ and $\overline{1c}$--;

line 67, "—" should be --17b--;
("17b")

line 68, "17b" should be --$\overline{17b}$--.

Col. 7, line 9, "$\overline{16e}$, $\overline{16e}$" should be --16e, $\overline{16e}$--;

line 10, "16e" should be --$\overline{16e}$--;

line 10, "$\overline{16f}$, 16f" should be --16f, $\overline{16f}$--;

line 20, "17b, $\overline{17b}$, ..." should be --17b, $\overline{17b}$, ... 17f, $\overline{17f}$--;

line 36, "17a and 17a." should be --17a and $\overline{17a}$.--;

line 40, "17c, 17e and 17e." should be --$\overline{17c}$, 17e and $\overline{17e}$.--;

UNITED STATES PATENT AND TRADEMARK OFFICE
CERTIFICATE OF CORRECTION

Page 3 of 5

PATENT NO. : 5,138,244
DATED : AUGUST 11, 1992
INVENTOR(S) : ITSUKI BAHN

It is certified that error appears in the above-identified patent and that said Letters Patent is hereby corrected as shown below:

Col. 7, line 42, "17b, 17b and 17d, 17d" should be --17b, $\overline{17b}$ and 17d, $\overline{17d}$--;

line 43, "17f, 17f," should be --17f, $\overline{17f}$,--;

line 48, "17b, 17b and 17d, 17d and 17f, 17f" should be --17b, $\overline{17b}$ and 17d, $\overline{17d}$ and 17f, $\overline{17f}$--;

line 59, "17a, 17a, 17c, 17c, 17e and 17e." should be --17a, $\overline{17a}$, 17c, $\overline{17c}$, 17e and $\overline{17e}$.--;

line 61, "17a, 17a, 17c, 17c, 17e, 17e and 17b, 17b," should be --17a, $\overline{17a}$, 17c, $\overline{17c}$, 17e, $\overline{17e}$ and 17b, $\overline{17b}$,--;

line 62, "17d, 17d, 17f, 17f," should be --17d, $\overline{17d}$, 17f, $\overline{17f}$,--.

Col. 8, line 33, "17a and 17a" should be --17a and $\overline{17a}$--;

line 45, "of" should be deleted.

UNITED STATES PATENT AND TRADEMARK OFFICE
CERTIFICATE OF CORRECTION

PATENT NO. : 5,138,244
DATED : AUGUST 11, 1992
INVENTOR(S) : ITSUKI BAHN

It is certified that error appears in the above-identified patent and that said Letters Patent is hereby corrected as shown below:

Col. 9, line 20, "voltage of the order on" should be --voltage on the order of--;

line 49, "energize" should be --energized--.

Col. 10, line 4, "17f, 17f" should be 17f, $\overline{17f}$--;

line 67, "17a, 17a, 17c, 17c, 17e, 17e," should be --17a, $\overline{17a}$, 17c, $\overline{17c}$, 17e, $\overline{17e}$,--.

Col. 11, line 2, "17b, 17b," should be --17b, $\overline{17b}$,--;

line 3, "17d, 17d, 17f, 17f." should be --17d, $\overline{17d}$, 17f, $\overline{17f}$.--;

line 5, "6(b)" should be --6(b))--;

line 47, "attached" should be --attracted--;

line 50, "armature coils" should be deleted.

UNITED STATES PATENT AND TRADEMARK OFFICE
CERTIFICATE OF CORRECTION

PATENT NO. : 5,138,244
DATED : AUGUST 11, 1992
INVENTOR(S) : ITSUKI BAHN

It is certified that error appears in the above-identified patent and that said Letters Patent is hereby corrected as shown below:

Col. 15, line 9, "a" should be deleted;

line 38, "that such" should be --such that--.

Signed and Sealed this

Thirtieth Day of November, 1993

Attest:

BRUCE LEHMAN

*Attesting Officer*  Commissioner of Patents and Trademarks